United States Patent [19]

Taguchi et al.

[11] Patent Number: 5,617,264

[45] Date of Patent: Apr. 1, 1997

[54] METHOD AND APPARATUS FOR REWRITING DATA TO A FLOPPY DISK BY STORING REPRODUCED DATA IN A MEMORY

[75] Inventors: Keiichi Taguchi; Hideho Maeda; Masaharu Yanaga, all of Kanagawa, Japan

[73] Assignee: Sony Corporation, Tokyo, Japan

[21] Appl. No.: 558,050

[22] Filed: Nov. 13, 1995

Related U.S. Application Data

[63] Continuation of Ser. No. 243,912, May 17, 1994, abandoned.

[30] Foreign Application Priority Data

May 19, 1993 [JP] Japan ................................ 5-117318

[51] Int. Cl.$^6$ ........................................................ G11B 5/09
[52] U.S. Cl. ................................. 360/54; 360/50; 360/48
[58] Field of Search ................................. 360/13, 50, 54, 360/57, 32, 53, 48

[56] References Cited

U.S. PATENT DOCUMENTS 4,811,280 3/1989 Berkowitz et al. ................. 360/50

5,388,013 2/1995 Nakamura ....................... 360/50 X

FOREIGN PATENT DOCUMENTS 2263577 7/1993 United Kingdom .

OTHER PUBLICATIONS

"Mustering WordPerfect 5.1 & 5.2 for windows" Alan Simpson, Nov. 1991, pp. 19, 28–29, 53, 404. SYBEX.

*Primary Examiner*—W. C. Kim
*Attorney, Agent, or Firm*—Jay H. Maioli

[57] ABSTRACT

A method and apparatus of reproducing and recording data stored in a plurality of tracks of a memory. A recording and reproducing head reproduces data from at least one of a plurality of tracks of a disk-shaped recording medium. The reproduced data is stored in a memory and rewritten. Data is read out of the memory and controllably supplied to a recording operation of the recording and reproducing head so that data of every track read out from the memory is recorded on the disk-shaped recording medium. In a preferred embodiment, the reproduced data is stored, rewritten read out from the memory in response to an index signal representing a starting portion of a track and then recorded on a magnetic floppy disk.

4 Claims, 7 Drawing Sheets

METHOD AND APPARATUS FOR REWRITING DATA TO A FLOPPY DISK BY STORING REPRODUCED DATA IN A MEMORY

This is a continuation of application Ser. No. 08/243,912 filed May 17, 1994 abandoned.

BACKGROUND OF THE INVENTION

1. Field of the Invention

The present invention relates to a method of and apparatus for recording and reproducing data for use with a computer system having a floppy disk drive, for example.

2. Description of the Prior Art

Heretofore, computers such as a personal computer and a work station or electronic equipment (e.g., music sequencers, devices sampling, etc. ) incorporating therein a microcomputer or the like house therein a floppy disk drive or they are connected to a floppy disk drive through an extended bus or the like to use the floppy disk drive.

It is customary that a floppy disk drive records data supplied thereto from the host equipment on a floppy disk set thereon or reproduces and supplies data recorded on the floppy disk to the host equipment on the basis of various commands supplied thereto from the host equipment such as a computer or the like.

FIG. 1 of the accompanying drawings shows a recording format used in a conventional floppy disk drive. The recording format of the floppy disk drive will be described with reference to FIG. 1.

In FIG. 1, reference symbol Idx depicts an index signal generated from a floppy disk drive mechanism to represent a starting portion of a track. Reference symbol Tp depicts a track pattern. Reference symbol "4E" shown on the leftmost portion of the track pattern Tp represents a gap G4a recorded on the starting portion of the track to protect data from a displacement of an index detection timing between the floppy disk drives. Reference symbol "00" represents a synchronizing (sync) signal SY, and reference symbols "C2" and "FC" depict an index address mark IAM used to detect the starting portion of the track. Reference symbol "4E" depicts a gap G1 used to discriminate the index address mark IAM and an identification number ID.

The next sector starts from the gap G1, and a sector 1, a sector 2, . . . , a sector n are continued as shown in FIG. 1. As shown by the area of the sector 1 in FIG. 1, each sector comprises an identification number ID, a gap G2 used to discriminate the identification number ID and data DA, the data DA and a gap G3 used to discriminate the sectors.

A magnetic head used by the floppy disk drive to record and reproduce data will be described with reference to FIG. 2. As shown in FIG. 2, there is provided a tunnel erase head 1, and a floppy disk (not shown) is rotated in the direction shown by a solid arrow A in FIG. 2. The tunnel erase head 1 includes a read write gap 1RWG and an erase gap 1EG. Upon recording, the tunnel erase head 1 records data by the read write gap 1RWG and generates a guardband of the tracks by the erase gap 1EG.

FIG. 3 shows a timing at which the floppy disk drive using the tunnel erase head 1 records data. In FIG. 3, reference symbol Tp depicts a track pattern, and WGP depicts a write gate pulse supplied from the host equipment (not shown). Reference symbols WP and EP depict a write signal and an erase signal generated in the inside of the floppy disk drive (not shown), respectively. When the tunnel erase head 1 is applied to the track pattern TP shown in FIG. 3, the read write gap 1RWG and the erase gap 1EG of the tunnel erase head 1 shown in FIG. 2 are reversed in position.

FIG. 3 shows the case that an area of data DA (shown hatched) of a certain track is rewritten. Specifically, when the area shown hatched is rewritten, the write gate pulse WGP is supplied from the host equipment, and the write signal WP and the erase signal EP are supplied from the floppy disk drive. As shown in FIG. 3, when the write gate pulse WGP is turned on, i.e., goes to logic low "0" level, then the write signal WP is turned on, i.e., goes to logic low "0" level. After a predetermined delay time D1 (i.e., erase-on delay), the erase signal EP is turned on. When the write gate pulse WGP is turned off, i.e., goes to logic high "1" level, then the write signal WP is turned off, i.e., goes to logic high "1" level. After a predetermined delay time D2 (erase-off delay), the erase signal EP is turned off, i.e., goes to logic high "1" level.

More specifically, when the tunnel erase head 1 is used, the erase pulse or signal EP is turned on and off with the predetermined delay times D1, D2 relative to the level of the write gate pulse WGP so that the erase signal EP goes to logic low "0" level during the gap G2 and goes to logic high "1" level during the gap G3.

The pre-erase head 2 shown in FIG. 2 includes an erase gap 2EG and a read write gap 2RWG. Upon recording, the pre-erase head 2 erases recorded data by the erase gap 2EG and then records data by the read write gap 2RWG.

FIG. 4 shows a timing at which the floppy disk drive using the pre-erase head 2 records data. In FIG. 4, reference symbol TP depicts a track pattern, and reference symbols WP and EP depict a write signal and an erase signal generated in the inside of the floppy disk drive (not shown). Reference symbol WPG depicts a write gate pulse supplied from a host equipment (not shown), and reference symbol Wda depicts data to be recorded. When the pre-erase head 2 shown in FIG. 2 is applied to the track pattern shown in FIG. 4, the read write gap 2RWG and the erase gap 2EG of the pre-erase head 2 shown in FIG. 2 are reversed in position.

FIG. 4 shows the case that the area of data DA (shown hatched) of a certain track is rewritten. Specifically, when the area shown hatched is rewritten, the write gate pulse WGP is supplied from the host equipment and the erase signal EP and the write pulse WP are supplied from the floppy disk drive. As shown in FIG. 4, when the write gate pulse WGP is turned on, i.e., goes to logic low "0" level, then the erase signal EP and the write signal WP are turned on, i.e., go to logic low "0" level. Also, when the write gate pulse WGP is turned off, i.e., goes to logic high "1" level, the erase signal EP is turned off, i.e., goes to logic high "1" level. After a predetermined time, the write signal WP is turned off, i.e., goes to logic high "1" level.

Specifically, when the pre-erase head 2 is used, the write gate pulse WGP and the erase pulse EP are simultaneously turned on and off so that the erase signal EP is turned on at the position of the gap G2 and turned off at the position of the gap G3. Since the pre-erase head 2 pre-erases (erases previously) the area of the data DA reliably, the pre-erase head 2 begins to record data from the intermediate portion of the gap G2 prior to the data DA to thereby record the gap data "4E" corresponding to the distance between the read write gap 2RWG and the erase gap 2EG.

As shown in FIG. 2, since the erase gap 2EG in the pre-erase head 2 is ahead of the read write gap 2RWG relative to the recording medium, if the pre-erase head 2 is activated when the position of the read write gap 2RWG becomes equal to the position of the gap G2, then a portion NEt which is not pre-erased by the pre-erase head 2 is produced on one portion of the gap G2 of the track pattern TP.

FIG. 5 shows a timing at which the floppy disk drive using the pre-erase head 2 records data. A format shown in FIG. 5 is different from that shown in FIG. 4. As is clear from the track pattern TP, according to the format shown in FIG. 5, an index signal Idx goes to logic high "1" level in the gap G1 which is followed by sectors of one track ranging from a sector 1 to a sector n. Each sector comprises an identification number ID, data DA and a gap G3 used to discriminate the sectors.

In FIG. 5, reference symbol Idx depicts an index signal, and reference symbol TP depicts a track pattern. The track pattern TP of one track amount is shown on the upper portion of FIG. 5, and the track pattern TP is shown on the lower portion of FIG. 5 in an enlarged scale. Further, in FIG. 5, reference symbol WGP depicts a write gate pulse supplied from the host equipment (not shown), and reference symbols WP and EP depict a write signal and an erase signal generated from the inside of the floppy disk drive (not shown). When the pre-erase head 2 shown in FIG. 2 is applied to the track pattern TP shown in FIG. 5, the read write gap 2RWG and the erase gap 2EG of the pre-erase head 2 shown in FIG. 2 are reversed in position.

FIG. 5 shows the case that the area of the data DA (shown hatched) of a certain track is rewritten. Specifically, when the area shown hatched in FIG. 5 is rewritten, the write gate pulse WGP is supplied from the host equipment, and the write signal WP and the erase signal EP are supplied from the floppy disk drive (not shown). As shown in FIG. 5, when the write gate pulse WGP is turned on, i.e., goes to logic low "0" level, the write signal WP and the erase signal EP are turned on, i.e., go to logic low "0" level. Also, when the write gate pulse WGP is turned off, i.e., goes to logic high "1" level, the erase signal EP is turned off, i.e., goes to logic high "1" level. After a predetermined time, the write signal WP is turned off, i.e, goes to logic high "1" level.

Specifically, when the pre-erase head 2 is used, the pre-erase head 2 is activated (erase-on) in the area of the data DA of the track pattern TP and is disabled (erase-off) in the gap G3. As earlier noted, since the erase gap 2EG in the pre-erase head 2 is ahead of the read write gap 2RWG relative to the recording medium, if the pre-erase head 2 is activated (erase-on) when the position of the read write gap 2RWG becomes equal to the starting position of the data DA, then the portion NEt, which is not pre-erased, is produced in one portion of the area of the data DA of the track pattern TP.

When the tunnel erase head 1 shown in FIG. 2 is used according to the format shown in FIG. 3 and when the pre-erase head 2 shown in FIG. 2 is used according to the format shown in FIG. 4, one track needs a number of gaps, such as the gap G1 used to discriminate the index address mark IAM and the gap G2, the gap G3 used to discriminate the sectors, in addition to the index address mark IAM.

In order to pre-erase (previously erase) the area of the data DA reliably, the pre-erase head 2 starts recording data from the intermediate portion of the gap G2 prior to the data DA to thereby record the gap data "4E" corresponding to the distance between the read write gap 2RWG and the erase gap 2EG. Therefore, the relatively wide gaps are formed. From a high density recording standpoint, it is not desirable that the recording area is consumed by the wide gaps.

Further, when the pre-erase head 2 shown in FIG. 2 is used according to the format shown in FIG. 5, no gap exists between the identification number ID and the data DA in the format shown in FIG. 5 so that the portion NEt, which is not pre-erased, is produced in a starting portion of the area of the data DA as shown in FIG. 5. As a consequence, when data is recorded, data is recorded on the portion NEt which is not pre-erased with the result that data cannot be recorded satisfactorily.

OBJECTS AND SUMMARY OF THE INVENTION

Therefore, it is an object of the present invention to provide a method of and apparatus for recording and reproducing data in which the aforesaid shortcomings and disadvantages of the prior art can be eliminated.

It is another object of the present invention to provide a method of and apparatus for recording and reproducing data in which data of any kind of format can reliably be pre-erased.

It is a further object of the present invention to provide a method of and apparatus for recording and reproducing data in which a recording capacity of a recording medium can be increased.

According to a first aspect of the present invention, there is provided a method of recording and reproducing data which comprises the steps of reproducing data recorded on a disk-shaped recording medium by a recording and reproducing head, storing reproduced data of at least one track in the memory, rewriting stored data, supplying data read out from the memory to the recording and reproducing head, and controlling a recording operation of the recording and reproducing head so that data of every track read out from the memory is recorded on the disk-shaped recording medium.

In accordance with a second aspect of the present invention, there is provided an apparatus for recording and reproducing data which comprises a recording and reproducing head for reproducing and recording data recorded on a disk-shaped recording medium, a memory for storing at least one track of data reproduced by the recording and reproducing head, and a controller for storing the data in the memory to thereby rewrite the stored data, supplying the data read out from the memory to the recording and reproducing head and controlling a recording operation such that data of every track read out from the memory is recorded by the recording and reproducing head on the disk-shaped recording medium.

The above and other objects, features, and advantages of the present invention will become apparent from the following detailed description of illustrative embodiments thereof to be read in conjunction with the accompanying drawings.

DETAILED DESCRIPTION OF THE PREFERRED EMBODIMENTS

A method of and apparatus for recording data according to the present invention will hereinafter be described in detail with reference to the drawings.

Figure 6:
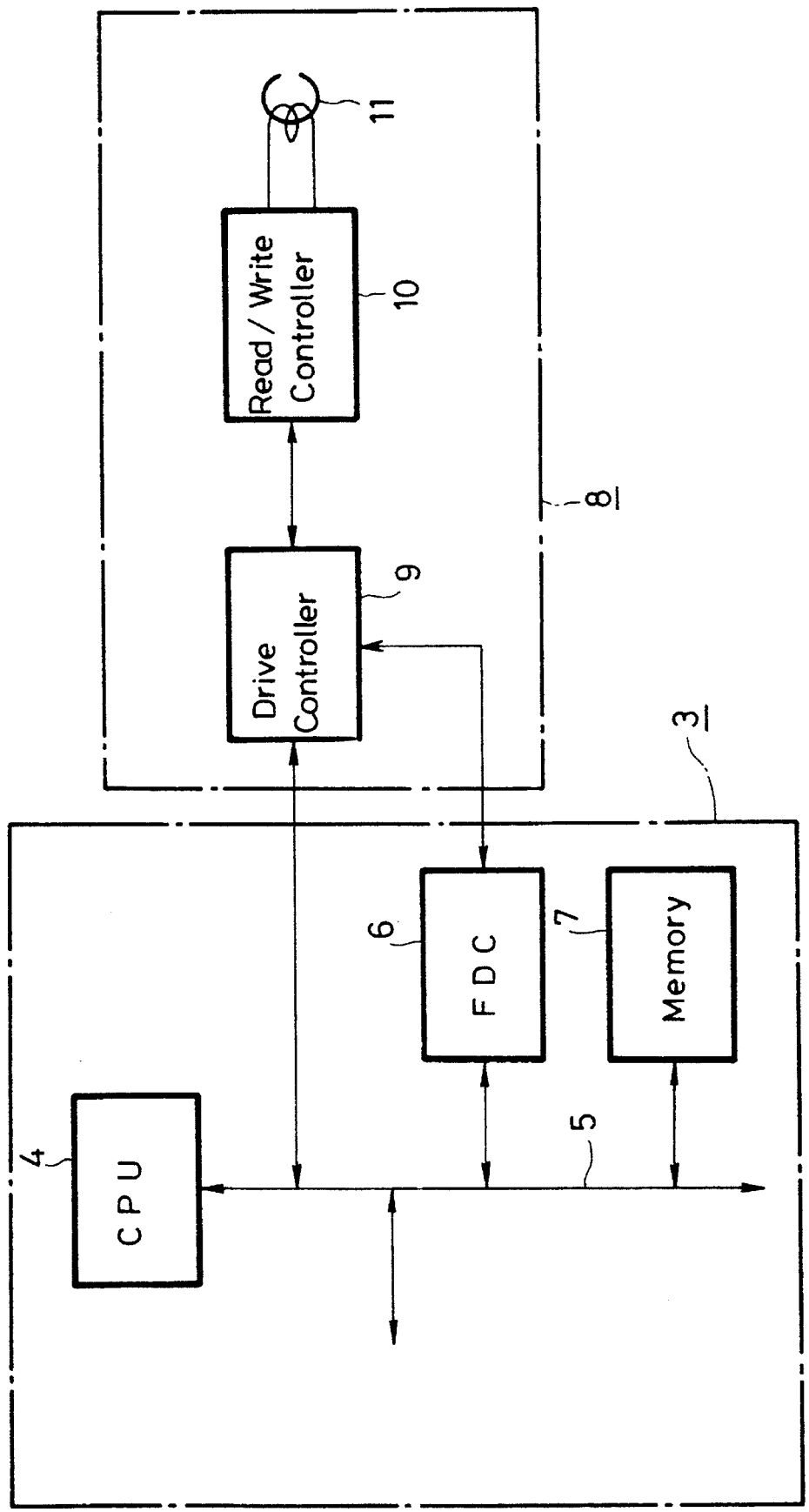
FIG. 6 is a schematic block diagram showing an apparatus for recording data according to a first embodiment of the present invention.

As shown in FIG. 6, there is provided a host equipment 3, such as a personal computer, a work station, a music sequencer or a sampling device using a floppy disk drive. A floppy disk drive (FDD) 8 records data supplied thereto from the host equipment 3 on a floppy disk (not shown) or reproduces data recorded on the floppy disk (not shown) and supplies the reproduced data to the host equipment 3 under the control of the host equipment 3.

The host equipment 3 comprises a CPU (central processing unit) 4, a bus 5 (formed of data bus, address bus and control bus) connected to the CPU 4, a floppy disk controller (FDC) 6 connected to the bus 5 and a memory 7 connected to the bus 5. The memory 7 might be a ROM (read-only memory) which stores a program or a RAM (random access memory) for a work area. Lines of various devices connected to the bus 5 are changed depending on the type of the host equipment 3, i.e., whether the host equipment 3 is the personal computer, the work station, the music sequencer or the sampling device, and therefore need not be illustrated. Elements that should be connected to the bus 5 are a display device, a keyboard, an audio circuit, and various interface circuits. The memory 7 stores data of one track.

Figure 1:
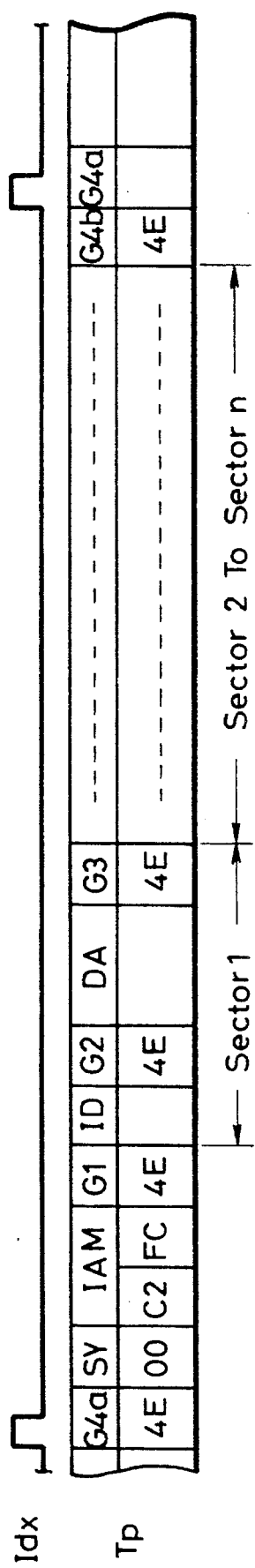
FIG. 1 is a diagram of a recording format used to explain a track pattern according to the prior art.
Figure 2:
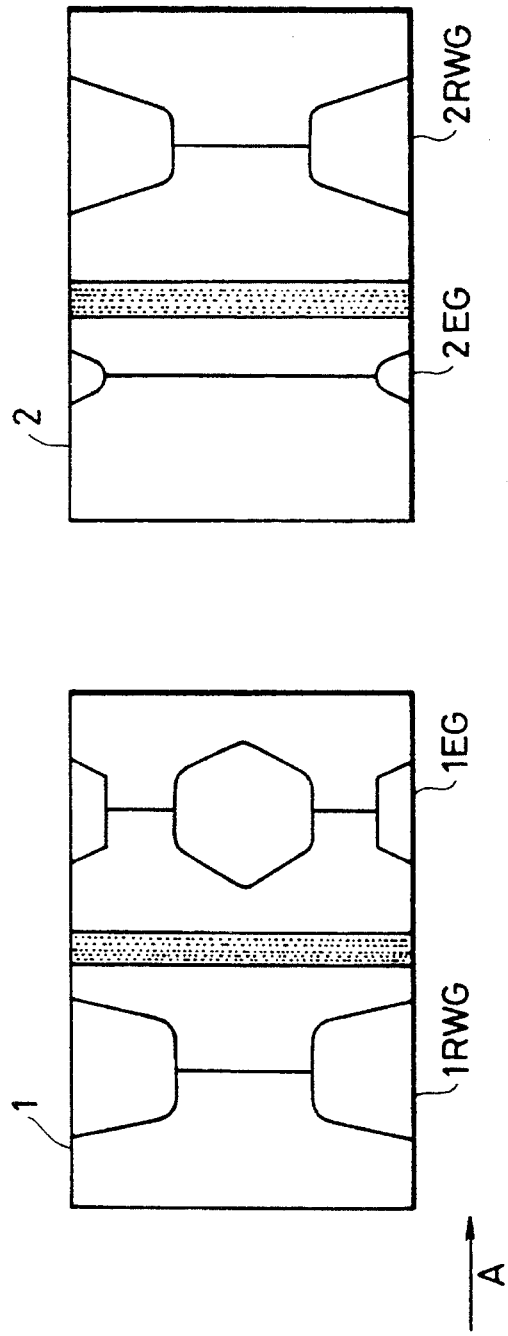
FIG. 2 is a diagram showing arrangements of a tunnel erase head and a pre-erase head according to the prior art.
Figure 3:
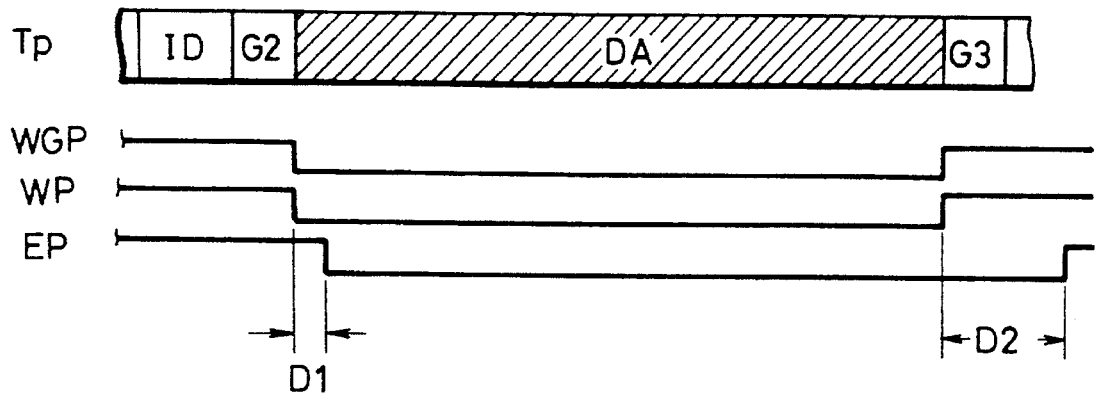
FIG. 3 is a diagram used to explain a timing at which data is written by using a tunnel erase head according to the prior art.
Figure 4:
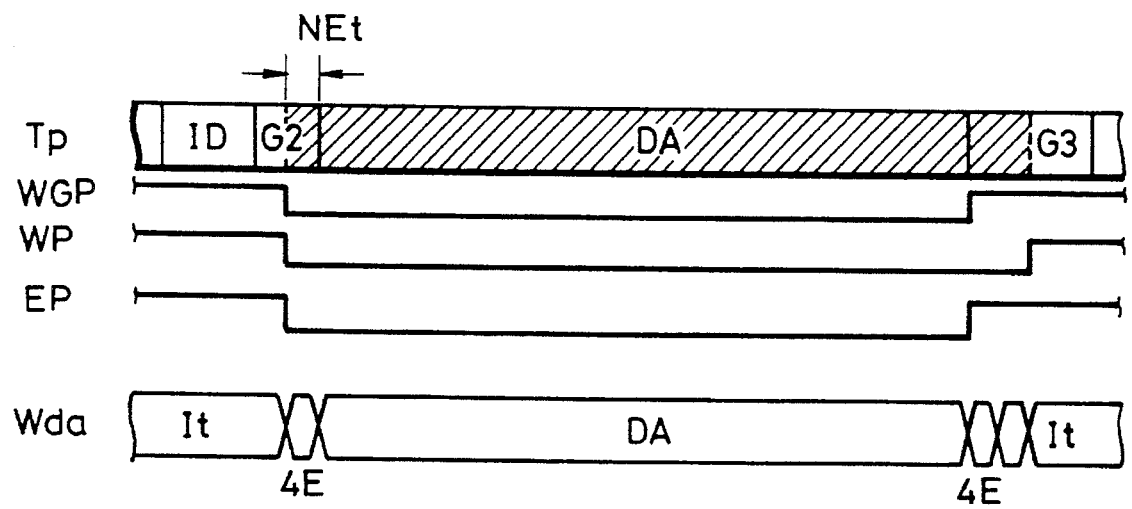
FIG. 4 is a diagram used to explain a timing at which data is written by using a pre-erase head with a certain recording format according to the prior art.
Figure 5:
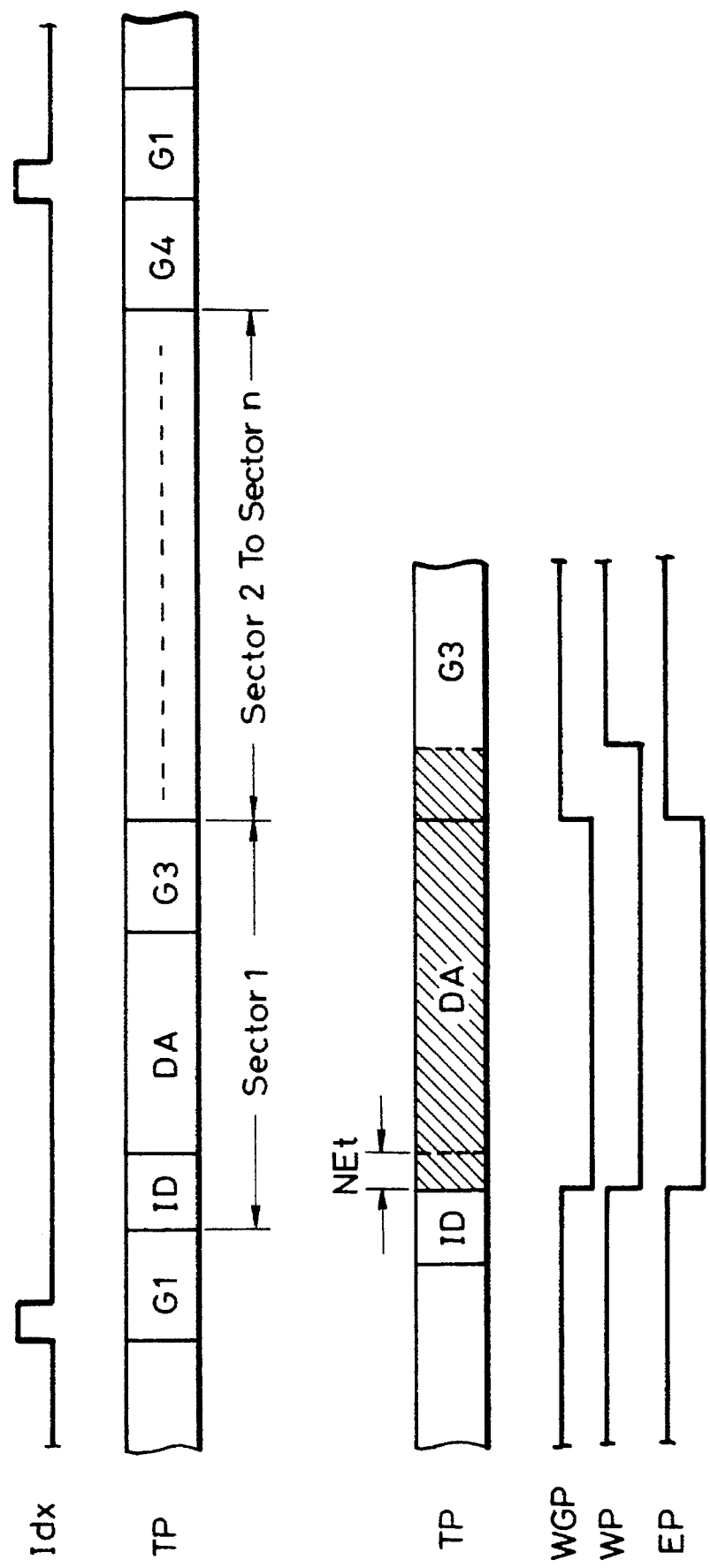
FIG. 5 is a diagram used to explain a timing at which data is written by the pre-erase head with another recording format according to the prior art.

The floppy disk drive (FDD) 8 includes a drive controller 9, a read/write amplifier 10 and a magnetic head 11 such as the pre-erase head shown in FIG. 2. The bus 5 of the host equipment 3 is connected to the drive controller 9 and the floppy disk controller (FDC) 6 is connected to the drive controller 9.

The reason that the pre-erase head is used as the magnetic head is as follows. If the tunnel erase head is used as a magnetic head to record data with a high density, such as 4 MB or the like, then a magnetic layer cannot be magnetized sufficiently so that a so-called overwrite modulation occurs. It is customary that the tunnel erase head is used to record data with a relatively low recording density, such as about 2 MB or the like.

Operation of the apparatus for recording data shown in FIG. 2, in particular, rewriting of desired data of a desired track of the floppy disk will be described below.

Initially, a command is supplied from the CPU 4 to the floppy disk controller (FDC) 6, whereby the floppy disk controller 6 controls the drive controller 9 of the floppy disk drive (FDD) 8. The drive controller 9 controls the magnetic head 11, e.g., turns on and off a motor (not shown) and feeds the magnetic head 11 to read data out of the floppy disk (not shown). Data read out from the floppy disk by the magnetic head 11 is converted by the read/write amplifier 10 to binary data and then supplied to the floppy disk controller 6 through the drive controller 9.

The floppy disk controller 6 discriminates data and a clock pulse from a pulse train of pulses sequentially supplied thereto. Having decoded the data, the floppy disk controller 6 converts serial data into parallel data and supplies the parallel data through the bus 5 to the memory 7, in which the parallel data is stored. At that time, since the pulse train contains the identification number ID, the data DA and data such as the gaps G1, G4, the floppy disk controller 6 locks its internal PLL (phase-locked loop) circuit on the basis of the identification number ID and the synchronization pattern SY provided at the starting portion of the data DA to thereby store the identification number ID and the data DA.

Although recorded information of the floppy disk on which data is recorded by another system becomes discontinuous because only the area of the data DA information of one track is rewritten, only the identification number ID and the data DA are read out and edited as continuous format data of one track.

After the data DA is stored in the memory 7, the CPU 4 rewrites only desired data stored in the memory 7. Then, when the index signal Idx from the drive controller 9 goes to logic high "1" level, the CPU 4 reads out data stored in the memory 7. Data read out from the memory 7 is supplied to the floppy disk controller 6. The floppy disk controller 6 converts parallel data supplied thereto from the memory 7 through the bus 5 to serial data and supplies the converted serial data to the drive controller 9.

The drive controller 9 supplies the serial data supplied thereto from the floppy disk controller 6 through the read/write amplifier 10 to the magnetic head 11. The data supplied to the magnetic head 11 is recorded by the magnetic head 11 on the floppy disk (not shown).

Figure 7:
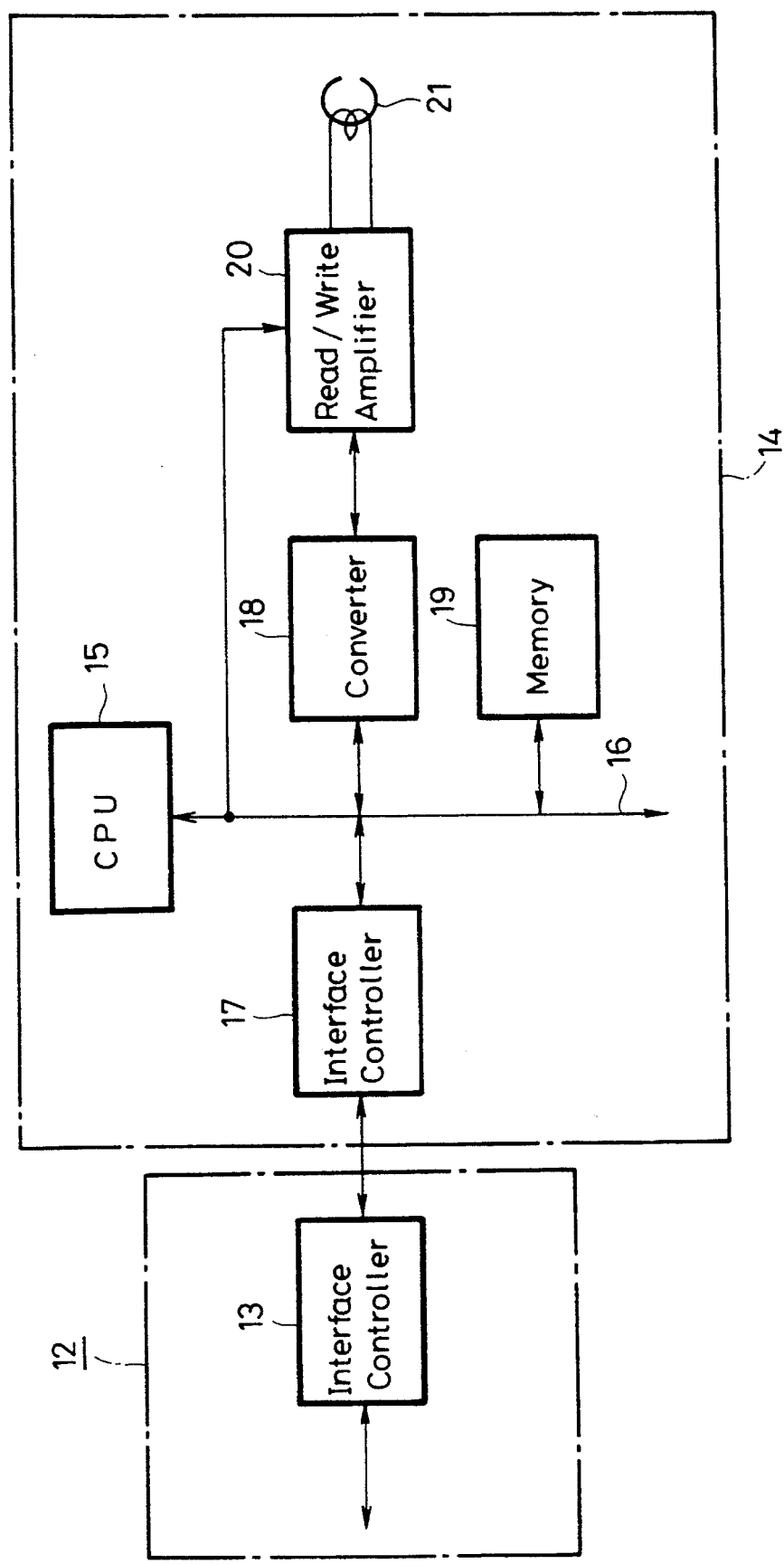
FIG. 7 is a schematic block diagram showing an apparatus for recording data according to a second embodiment of the present invention.

FIG. 7 shows another embodiment of the apparatus shown in FIG. 6. The apparatus shown in FIG. 7 is different from the apparatus shown in FIG. 6 in that the floppy disk drive includes a memory and a control system.

As shown in FIG. 7, there is provided a host equipment 12 which comprises an interface controller 13 and other host equipment body apparatus (not shown) connected to the interface controller 13. Other host equipment body apparatus might be a display device, a keyboard, an audio circuit, etc., depending on the kind of the host equipment and therefore need not be shown for simplicity.

A floppy disk drive (FDD) 14 includes a CPU 15, a bus (data bus, address bus and control bus) 16 connected to the CPU 15, an interface controller 17, a memory 19, a converter 18 connected to the bus 16, a read/write amplifier 20 connected to the converter 18 and a magnetic head 21 connected to the read/write amplifier 20. The memory 19 might be formed of a ROM in which a program is stored or a RAM for a work area.

An interface, such as an SCSI (small computer system interface), is used as the interface of the interface controllers 13, 17.

Operation of the apparatus shown in FIG. 7, in particular, rewriting of desired data of a desired track of the floppy disk will be described.

As shown in FIG. 7, a command to the CPU 15 is supplied to the floppy disk drive 14 from the host equipment 12 through the interface controller 17 and the bus 16. The CPU 15 controls the magnetic head 21, e.g., turns on and off a motor (not shown) or feeds the magnetic head 21 to thereby read out data from the floppy disk (not shown).

Data read out of the floppy disk by the magnetic head 21 is converted into binary data by the read/write amplifier 20 and then supplied to the converter 18, in which it is decoded and converted in the form of serial to parallel data. At that time, since the pulse train supplied thereto includes the identification number ID, the data DA and data such as the gaps G1 and G4, the converter 18 locks its internal PLL circuit by the identification number ID and the synchronization pattern SY of the starting portion of the data DA to thereby store the identification number ID and the data DA. The parallel data from the converter 18 is stored in the memory 19 under the control of the CPU 15.

Although recorded information of the floppy disk in which data was recorded by another system becomes discontinuous at the gap portion because only the area of the data DA is rewritten by information of one track, only the identification number ID and the data DA are read out and then edited as continuous data of one track.

After the data is stored in the memory 19, the CPU 15 is supplied with data to be rewritten from the host equipment 12 through the interface controller 17 and rewrites only the desired data stored within the memory 19. Thereafter, the CPU 15 reads the data stored in the memory 19. Data read out from the memory 19 is supplied to the converter 18. The converter 18 converts parallel data supplied thereto from the memory 19 through the bus 16 to serial data. Then, the converter 18 encodes the serial data and supplies the encoded serial data to the read/write amplifier 20.

The read/write amplifier 20 supplies the serial data from the converter 18 to the magnetic head 21. The data supplied to the magnetic head 21 is recorded by the magnetic head 21 on the floppy disk (not shown). The interface controllers 13, 17 are used to exchange the command level and to effect the data transfer.

A rewriting operation and a related format will be described below with reference to FIGS. 8 and 9.

Figure 8:
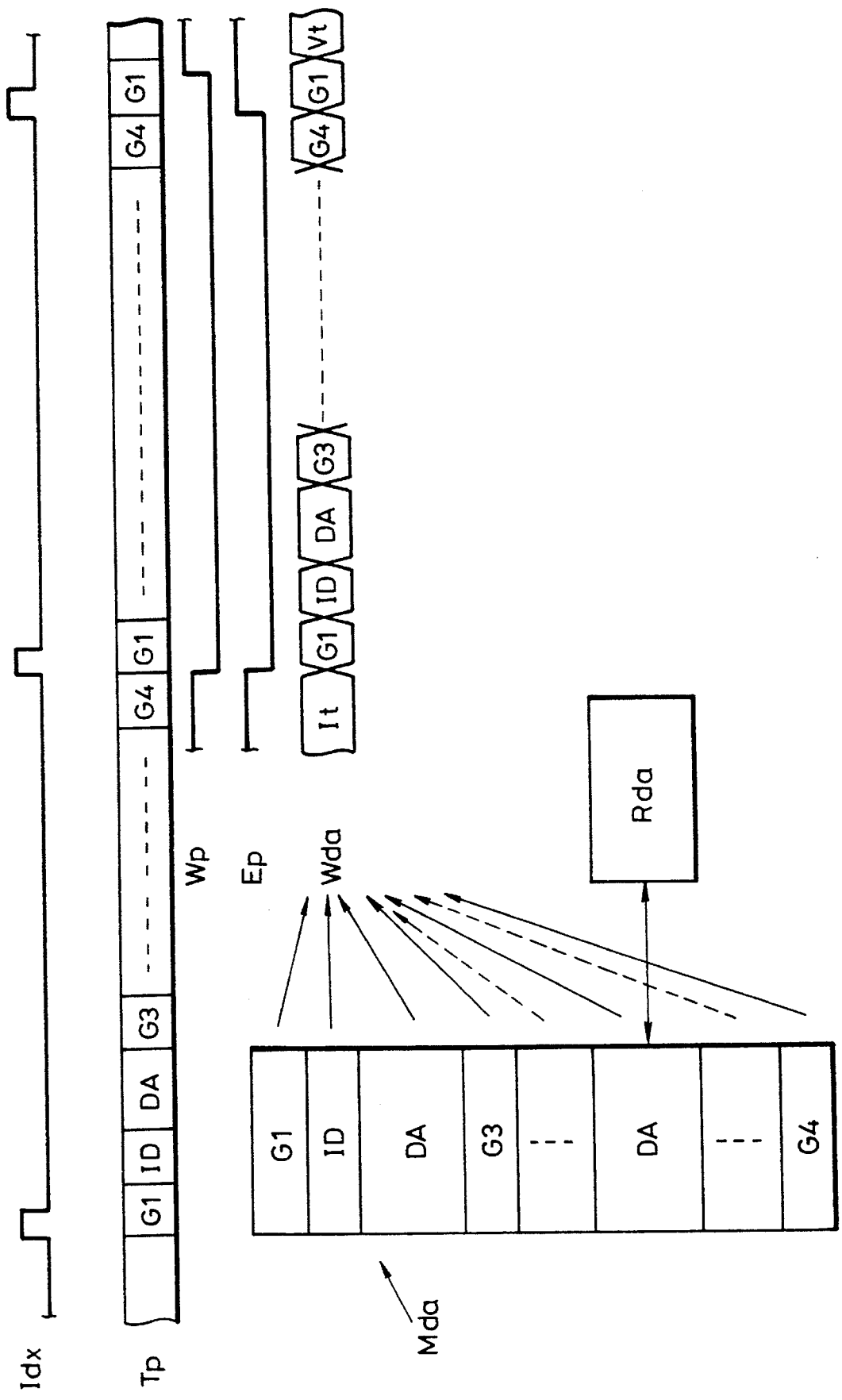
FIG. 8 is a diagram used to explain how to rewrite data of one track according to the present invention.

In FIG. 8, reference symbol Idx depicts an index signal, reference symbol Tp depicts a track pattern, reference symbol Mda depicts memory data, reference symbol Wp depicts a write pulse, reference symbol Ep depicts an erase pulse, reference symbol Wda depicts write data and reference symbol Rda depicts rewrite data (data to be rewritten). As shown in FIG. 8, one track comprises a gap G1, an identification number ID, data DA, a gap G3, . . . , gap G4. A period of the index signal Idx ranging from the leading edge of the first pulse of logic high "1" level to the next leading edge of the pulse of logic high "1" level is used as the data storing period. Further, a period of the index signal Idx ranging from the leading edge of the pulse of logic high "1" level to the next leading edge of the pulse of logic high "1" level is used as the data rewriting period.

As shown by the memory data Mda on the left-hand side of FIG. 8, data are stored in the memory (the memory 7 in FIG. 6 and the memory 19 in FIG. 7) in the sequential order of the gap G1, the identification number ID, the data DA, the gap G3, . . . , data DA, . . . , the gap G4. Subsequently, only the data that should be rewritten is rewritten in the memory 7 or 19 (see FIG. 6 or 7).

In the data rewriting period of the index signal Idx, when the write pulse Wp goes to logic low "0" level and the erase pulse Ep goes to logic low "0" level, the write data provided in the invalid data period It enters the valid data period Vt so that data read out from the memory 7 or 19, i.e., the gap G1, the identification number ID, the data DA, the gap G3, . . . , the data DA, . . . , the gap G4 are sequentially recorded on the floppy disk (not shown).

According to the arrangement shown in FIG. 6, the data read out from the memory 7 is supplied through the floppy disk controller 6, the drive controller 9 and the read/write amplifier 10 to the magnetic head 11 and then recorded on the floppy disk (not shown) by the magnetic head 11.

Further, according to the arrangement shown in FIG. 7, the data read out from the memory 19 is supplied through the converter 18 and the read/write amplifier 20 to the magnetic head 21 and then recorded on the floppy disk (not shown) by the magnetic head 21.

According to the present invention, all data on the track are read out during the first period, stored in the memory and then recorded during the next period in the sequential order in which the data are recorded. During this period, data of the sector that should be rewritten is rewritten when it is stored in the memory or after it is stored in the memory.

If data of every sector is recorded by the pre-erase head according to the format having no gap provided between the area of the identification number ID and the area of data DA, an overwrite portion, which is not pre-erased, is produced at the leading portion of the area of the data DA, thereby deteriorating an S/N (signal-to-noise) ratio. According to the present invention, even if data of one track is constantly recorded, then although a discontinuous portion or an overwrite portion is left in the write starting or ending portion, such discontinuous portion or the overwrite portion falls within the area of the gap G1. Therefore, a reliability in the area of the data DA can be assured.

Figure 9:
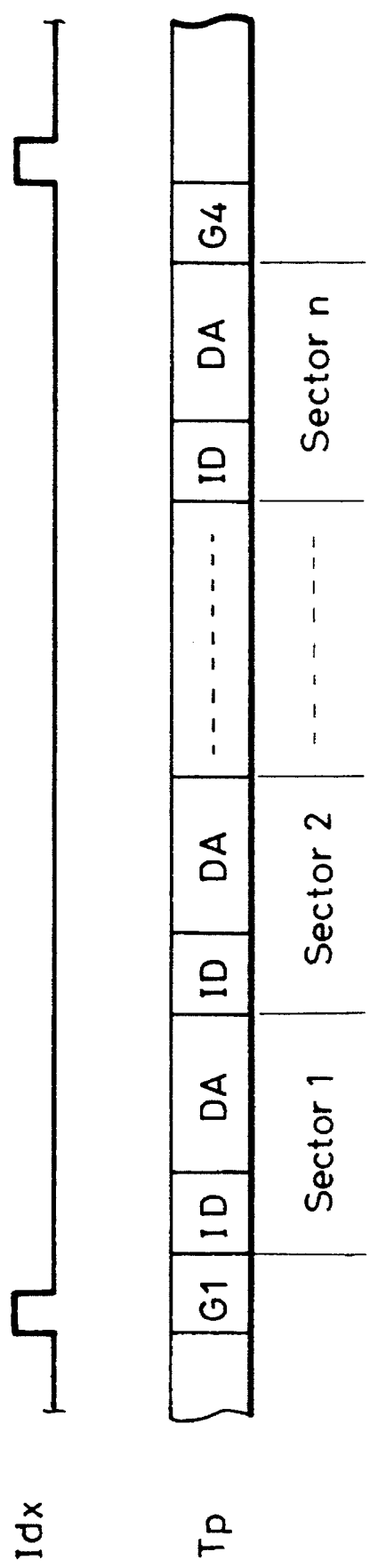
FIG. 9 is a diagram showing a format with which data of one track can be rewritten according to the present invention.

FIG. 9 shows an example of a track format which can be used when the above-mentioned one track write method is used. As shown in FIG. 9, in this format, the track pattern Tp comprises a gap G1 provided at the starting portion thereof, sectors from a sector 1 to a sector n and a gap G4 provided at the end thereof. Each sector is composed of an identification number ID and data DA.

While the gaps G1 and G4 for absorbing the fluctuation of one period are required, gaps (e.g., gaps G2 and G3) provided ahead of and behind the area of the data DA are not required at all. Specifically, while the recording capacity of the formatted track is reduced by the gaps G2 and G3 as compared with the unformatted track, the recording capacity of the formatted track can be increased by the removal of the gaps G2, G3.

As set out, according to the present invention, since all data on the track are stored in the memory at the first period and data of the sector that should be rewritten is rewritten when data is stored in the memory or after data is stored in the memory, if data is rewritten at the sector unit by the pre-erase head according to the format in which the sector has no gaps, then it can be avoided that the overwrite portion, which is not pre-erased, is produced on the leading portion of the area of the data DA, thereby the S/N ratio being deteriorated. Further, since it becomes possible to use the simplest format from which extra gaps are removed, the recording capacity of the media can be increased considerably.

According to the present invention, since the data recorded on the magnetic recording medium is read out by the magnetic head and the data thus read is stored in the memory means, designated data is rewritten when the data is stored in the memory means or after the data is stored in the memory means, the data read out from the memory means is supplied to the magnetic head and the pre-erase operation of the magnetic head and the recording operation for recording the data from the memory means on the magnetic recording medium are controlled by the control means, it can be avoided that, even when the data of the sector having no gaps provided therebetween is rewritten by the pre-erase head at the sector unit, the overwrite portion, which is not pre-erased, is produced on the starting portion of the data area, thereby deteriorating the S/N ratio. Therefore, data can be recorded on the recording medium satisfactorily. Further, the recording capacity of recording media can be increased by minimizing the number of the necessary gaps.

Further, according to the present invention, data of one track recorded on the magnetic recording medium can be read by the magnetic head. The read-out data of one track is stored in the memory means, and designated data is rewritten when data of one track is stored in the memory means or after data of one track is stored on the memory means. Also, the data of one track read out from the memory means is supplied to the magnetic head so that the pre-erase operation of the magnetic head and the recording operation for recording the data of one track from the memory means on the magnetic recording medium are controlled by the control means. In addition to the aforesaid effects, data can satisfactorily be recorded on the magnetic medium by a simple processing.

Having described preferred embodiments of the invention with reference to the accompanying drawings, it is to be understood that the present invention is not limited to those precise embodiments and that various changes and modifications could be effected therein by one skilled in the art without departing from the spirit or scope of the invention as defined in the appended claims.

What is claimed is:

1. A method of recording and reproducing data comprising the steps of:

reproducing data including gap data, an identification number and a synchronization pattern recorded in a plurality of tracks on a floppy disk by a pre-erase magnetic recording and reproducing head;

synchronizing a floppy disk controller on the basis of the reproduced identification number and the synchronization pattern;

storing reproduced data of at least one of the plurality of tracks in a memory, the stored reproduced data including the gap data and the identification number;

rewriting at least a portion of the reproduced data;

reading out from the memory the stored data including the gap data, the identification number and rewritten data according to an index signal representing a starting portion of a track;

supplying the data read out from the memory including the gap data and the identification number, to the pre-erase magnetic recording and reproducing head; and controlling a recording operation of the pre-erase magnetic recording and reproducing head using the floppy disk controller so that data of every track read out from the memory, including the gap data and the identification number, is recorded on the floppy disk, the recorded data including gap data at a beginning and an end thereof.

2. An apparatus for recording and reproducing data comprising:

a pre-erase magnetic recording and reproducing head for reproducing and recording data including gap data, an identification number and a synchronization pattern recorded in a plurality of tracks on a disk-shaped recording medium;

memory means for storing data of at least one of said plurality of tracks reproduced by said pre-erase magnetic recording and reproducing head, the stored data including the gap data and the identification number; and control means synchronized on a basis of the reproduced identification number and synchronization pattern, for rewriting stored data in said memory means, supplying stored data including the gap data, the identification number and rewritten data read out from said memory means in response to an index signal representing a starting portion of a track to said pre-erase magnetic recording and reproducing head and controlling a recording operation such that data of every track read out from said memory means, including the gap data and the identification number, is recorded by said pre-erase magnetic recording and reproducing head on said disk-shaped recording medium, the recorded data including gap data at a beginning and an end thereof.

3. The apparatus according to claim 2, wherein said magnetic disk is a floppy disk.

4. The apparatus according to claim 3, further comprising interface means for connecting a host equipment and a disk drive apparatus, said memory means and said control means being incorporated in said disk drive apparatus.

* * * * *

UNITED STATES PATENT AND TRADEMARK OFFICE
CERTIFICATE OF CORRECTION

PATENT NO. : 5,617,264
DATED : April 01, 1997
INVENTOR(S) : Keiichi Taguchi, Hideho Maeda & Masaharu Yanaga It is certified that error appears in the above-identified patent and that said Letters Patent is hereby corrected as shown below:

Col.1, line 18, change "devices sampling" to --sampling devices--

Col.8, line 27, change "then although" to --and--
Col.9, line 18, change "on" to --in--
Col.10, line 3, after "memory" insert --,--

Signed and Sealed this

Twentieth Day of January, 1998

Attest:

BRUCE LEHMAN

Attesting Officer     Commissioner of Patents and Trademarks